Sept. 9, 1958  G. GOODLET  2,851,068
COMBINATION SWING AND TABLE SAW WITH INVERTIBLE TABLE
Filed June 5, 1957  2 Sheets-Sheet 1

INVENTOR.
Gilbert Goodlet
BY
Thos. E. Scofield
ATTORNEY.

Sept. 9, 1958 G. GOODLET 2,851,068
COMBINATION SWING AND TABLE SAW WITH INVERTIBLE TABLE
Filed June 5, 1957 2 Sheets-Sheet 2

INVENTOR.
Gilbert Goodlet
BY
Thos. E. Scofield
ATTORNEY.

United States Patent Office 2,851,068
Patented Sept. 9, 1958

2,851,068

COMBINATION SWING AND TABLE SAW WITH INVERTIBLE TABLE

Gilbert Goodlet, Weston, Mo.

Application June 5, 1957, Serial No. 663,700

12 Claims. (Cl. 143—132)

This invention relates to power saws and refers more particularly to a combination saw adaptable for use either as a table saw or a drop saw without any change in the construction of the apparatus and with a minimum of adjustment of parts.

Previously, table saws with the blade and drive means therefor mounted under the table have been provided and, as well, drop and radial arm saws are available with the blade and power means therefor mounted above the table or work surface. Each of these saw types has a number of well defined, exclusive uses for which it is alone used or best used. In many construction projects and the like, the availability of both kinds of saw is required. Since each type is considerably expensive, in such case there is a dual expense to the project and, as well, the two saws take up twice the space at the project and in transportation thereto of a single saw. Additionally, sometimes the same work is worked upon by both saws and must be transferred between them. Finally, in both of the conventional types of saws, table saws and drop or radial arm saws, the cutting blade is not adjustable to a plurality of longitudinal positions relative the work surface and the blade slot or opening in the work surface. Particularly are the blades not adjustable in this manner during a single sawing operation.

Therefore, an object of the invention is to provide a combination table saw and drop or radial arm saw which possesses all of the features and advantages of both types of saws.

Another object of the invention is to provide a combination table and drop saw which is simple of construction, has a minimum number of parts and is easy to manufacture.

Another object of the invention is to provide a combination drop and table saw wherein the combination saw may be shifted from one type of sawing operation to the other very quickly and with a minimum amount both of readjustment of parts and effort on the part of the operator.

Another object of the invention is to provide a combination table and drop saw wherein the cutting blade is adjustable longitudinally of the platform or work surface in either type of operation, said adjustment being extremely simple and easy yet permitting rigid fixing of the blade in a selected position.

Yet another object of the invention is to provide a combination table and drop or radial arm saw wherein provision is made for all of the customary attachments and aids generally employed with both types of saws and in all types of sawing operations employed with such saws.

Another object of the invention is to provide a combination table and drop or radial arm saw which occupies a minimum amount of space, may be constructed in various sizes without complicating or hindering the operation of a given sized saw and which takes up a minimum amount of space during the shifting from one type of saw to the other.

Still another object of the invention is to provide a combination table and drop or radial arm saw which is attractive in appearance and presents no hazard to the operator in the process of changing from one type of saw to the other and which offers no more hazard to the operator in operation than either of the conventional types of saws.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

Fig. 7 is a view taken along the lines 7—7 of Fig. 2 in the direction of the arrows.

The inventive combination saw is mounted on a frame having four legs 10 connected with and spaced from one another by spacing members 11 to define a rectangular space therebetween. Longitudinal top members 12 are fixed to the top ends of opposing pairs of legs. The spacing members joining the end legs are fixed relatively low on said legs out of the arc of motion of the platform, as to be described. The top members themselves are rectangular or square in cross section whereby to have flat top surfaces. The legs and top members are rigidly fixed relative one another in a very strong arrangement, resistant to deformation in any way.

Figures 3, 5, 6:
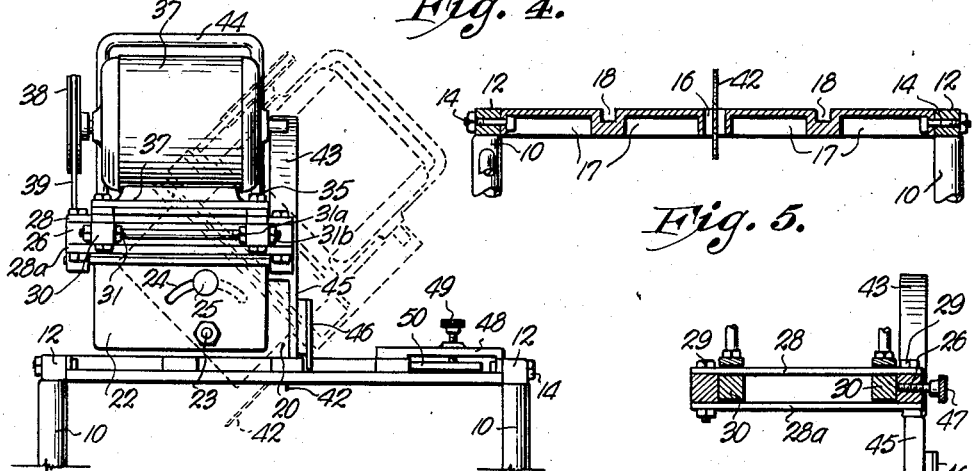
Fig. 3 is an end view of the inventive combination saw adjusted for drop or radial arm operation, the full line showing illustrating vertical operation and the dotted line showing illustrating tilted operation.
Fig. 5 is a view taken along the lines 5—5 of Fig. 4 in the direction of the arrows.
Fig. 6 is a view taken along the lines 6—6 of Fig. 2 in the direction of the arrows.
Figure 8:
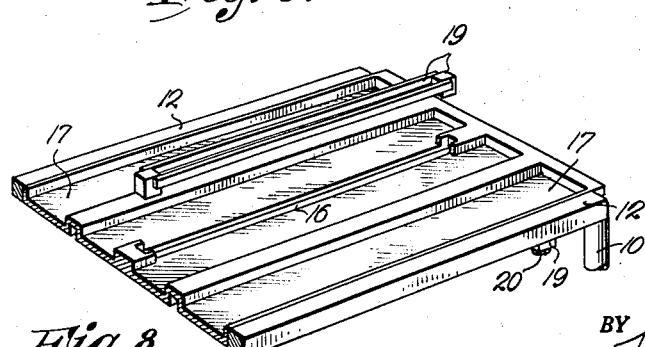
Fig. 8 is a fragmentary perspective view of the top of the work surface or platform arranged for drop or radial arm operation, the view being exploded to show the removal of the blade opening rim for the angled operation shown in dotted lines of Fig. 3.

A platform, table or work surface 13 is positioned between the two top members and pivotally mounted thereon by bolts 14 and nuts 15 preferably substantially centrally both of the ends of the top members and the ends of the work surface. The configuration of the platform in cross section is shown in Fig. 5. A blade receiving slot or opening 16 extends through the center of the platform longitudinally thereof. A plurality of wide grooves 17 are formed in the drop saw side of the platform, to be described, and a pair of relatively narrow grooves 18 are formed in the table saw side of the platform, also to be described. The grooves 17 and 18 are preferably evenly positioned relative the central blade opening 16. This "corrugated" construction, while providing necessary recesses, also both strengthens and lightens the platform. Platform positioning arms or pieces 19 (Fig. 7) are preferably fixed to the undersides of each of the top members 12 adjacent the ends thereof by bolts 20 and may be moved in under the platform when it is in a horizontal position or moved out from under the platform to permit rotation of the latter around the pivotally mounted bolts 14. The height of the frame is preferably sufficient to permit the rotation of the platform around its pivotal mounting, or, at least one-half of the length of the platform. Alternately, the supporting surface for the frame in a permanent mounting thereof may be hollowed out to permit this rotation. The platform is preferably also pivoted by the bolts 14 centrally of the thickness thereof and so spaced relative the top members that when either side of the platform is horizontal, the upper surface of the platform is in line with the top surfaces of the top members 12. The blade opening 16 preferably has a removable rim assembly 19 (Fig. 8) to permit tilted sawing action, as will be presently described.

Figure 1:
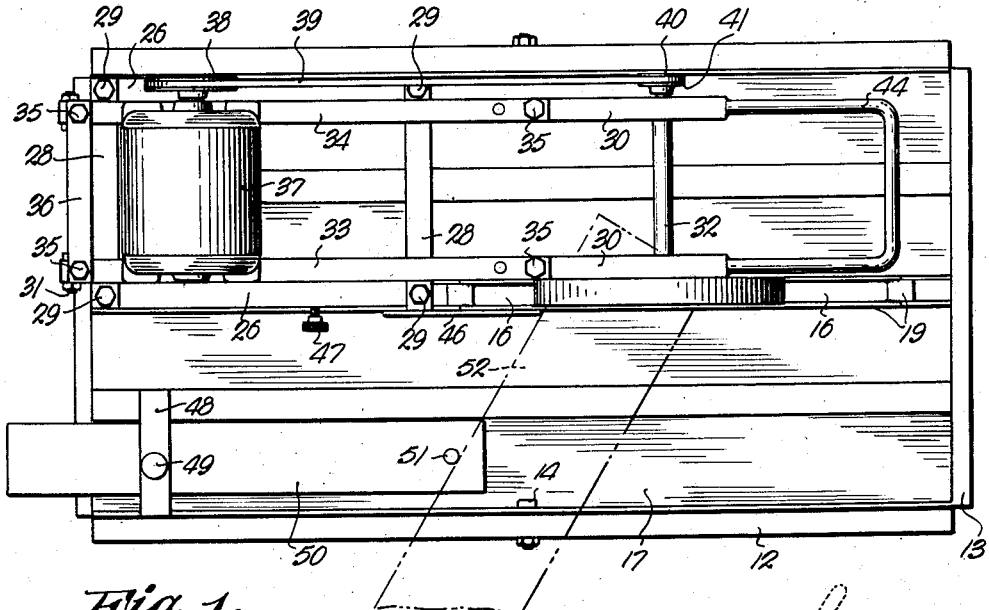
Fig. 1 is a plan view of the inventive combination saw adjusted for drop or radial arm operation, a dotted line showing of a board being included to illustrate typical drop or radial arm operation.
Figure 2:
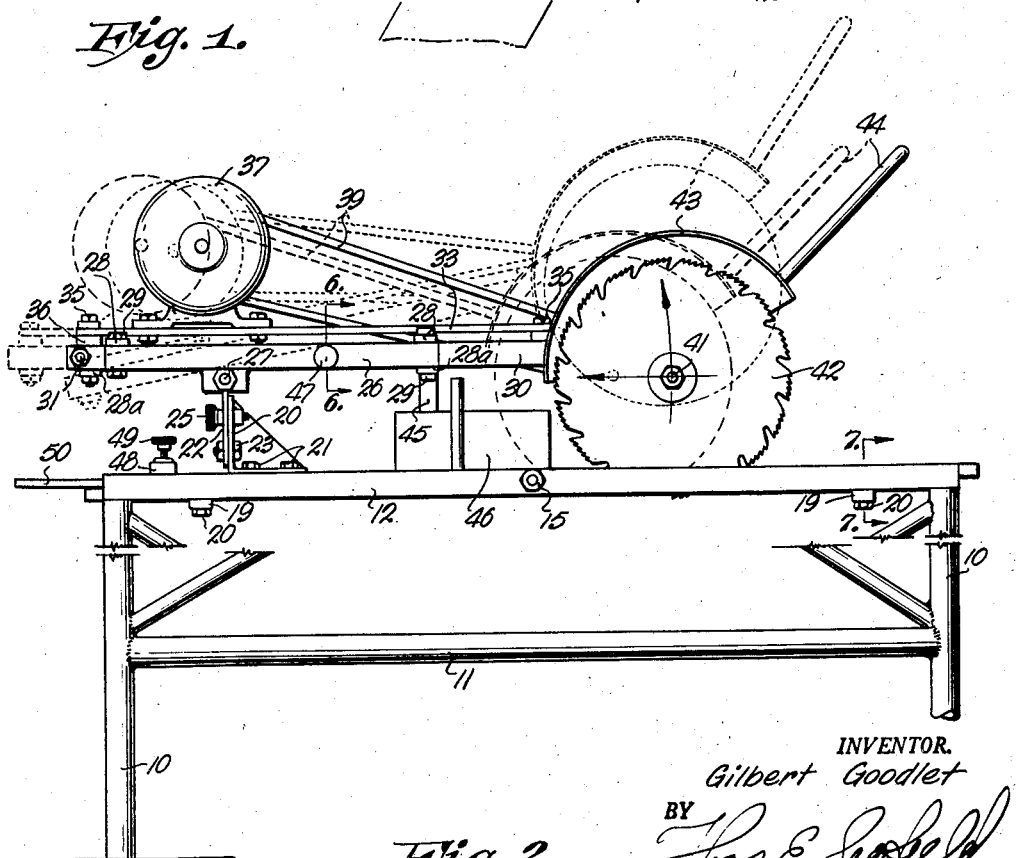
Fig. 2 is a side view of the inventive combination saw in position for drop or radial arm operation, a first dotted line showing illustrating the lifting of the blade mounting arm and a second dotted line showing illustrating longitudinal adjustment of the blade mounting arm.

The drop saw construction will be first described and then the table saw construction. Figs. 1, 2 and 3 show the drop saw operating arrangement of the inventive combination saw. Mounting bracket 20 is fixed to the drop saw side of the platform 13 by bolts 21. Mounting plate 22 is pivotally mounted by bolt 23 on bracket 20 and has slot 24 therein to engage adjustable, tightening screw engagement 25, this assembly permitting tilting of the mounting plate the length of the slot and tightening of the engagement 25 to hold it in any one of the tilted positions. A slide receiving frame having side bars 26 is pivotally mounted on the shaft 27 which is fixed to the top of mounting plate 22. Slide bars 26 are connected at the front and rear thereof by upper and lower cross beams 28 and 28a engaging the side bars 26 by bolts 29. Slidably mounted within the frame are longitudinal slide members 30 which are spaced apart from and positioned relative one another by a rear cross member 31 (Fig. 3) and a bearing sleeve 32 (Fig. 1) adjacent the free end of the slide, the latter having nuts 31a and 31b thereon. Upper secondary frame attached to the slide comprises a pair of longitudinal members 33 and 34 fixed to and above the longitudinal bars of the slide 30 by bolts 35 and spaced to clear cross members 28. Rear secondary frame cross member 36 extends between, spaces and connects the rear end members 33 and 34 and is also engaged by bolts 35. The holes for the bolts 29 in the frame are of a slightly greater inner diameter than the outer diameters of the bolts whereby the frame may be adjusted for wear of the slide.

Power source 37 is fixed to the secondary frame members 33 and 34 and has pulley 38 mounted on the drive shaft thereof driving belt 39 connected to second pulley 40. Pulley 40 is mounted on drive shaft 41 extending through bearing sleeve 32. Saw blade 42 is removably mounted on shaft 41. Shield or hood 43 encloses the upper portion of the blade. Handle 44 is connected to the front ends of the slide members 30. Frame supporting rest or post 45 is removably positioned in a socket in the platform top and has shield and guide 46 attached thereto. The post 45 is positioned under the end of the frame 26 so the latter will abut and rest on it when the frame moves down to a certain level around its pivot shaft 27. Adjusting screw 47 (Figs. 2 and 6) serves to lock the slide members 30 at any desired longitudinal position relative the frame 26 and also may be loosened to permit readjustment of this position. The loosening of adjusting screw 47 also permits longitudinal back and forth movement of the saw blade 42 in actual sawing operation when the saw is being used as a drop saw as in Fig. 2.

Referring now to Figs. 1 and 3, in one of the grooves 17, preferably the one next to the side of the platform, an overlying arm 48 is fixed across two of the high points of the platform to bridge the groove 17. Arm 48 has an adjusting screw 49 threaded therethrough. Sliding member 50 having upwardly extending pole or arm 51 is then positionable in, slidable with the groove 17 and fixable at various longitudinal positions therein by the screw member 49. The typical use of this member is shown in Fig. 1 where a board 52 is shown in dotted lines abutting guide plate 46 next the blade 42 and the post 51 outwardly therefrom to be fixed in angular position relative the cutting blade 42.

In operation of the invention as a drop saw, the side of the platform having the grooves 17 is positioned facing upwardly and the platform locked horizontally by the arms 19. The slide members 30 are movable as desired longitudinally of the table or fixable at any position longitudinally of the table in the sawing operation. Work or board such as 52 may be positioned as desired relative the cutting blade and blade opening 16 in the table by varying the adjustment of the sliding piece 50 and its pole or support 51. Tightening of screw 49 locks the member 50 in any desired longitudinal position. The operator, by grasping handle 44, raises and lowers the slide within the frame, the latter pivoting around shaft 27.

To swing the inventive device to the table saw modification, three adjustments must be made. The slide must be fixed against longitudinal movement by tightening of screw 47, the arms 19 swung out from under the platform and a turnbuckle (Fig. 4) or other fixing means connected between loops 54 and 55 on the platform and frame underside cross member 28, respectively. The turnbuckle 53 fixes the frame and slide against pivotal motion around shaft 27 relative the platform and is adjustable to make any desired amount of the cutting blade 42 extend through the blade opening 16 in the platform. With these three adjustments made, the operator may then merely grasp the end of the table by the hand and swing it downwardly or upwardly, as desired, in a 180° arc so the drop saw side of the platform is positioned downwardly as seen in Fig. 4, with the table saw surface upwards.

Figure 4:
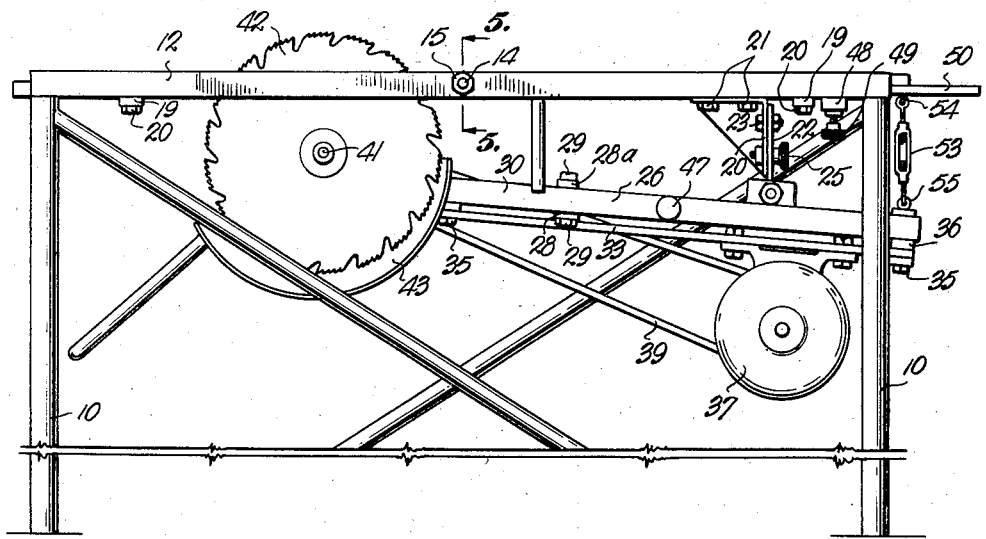
Fig. 4 is a side view of the inventive combination saw prepared for operation as a table saw.

Referring now to the operation of the device as in Fig. 4 as a conventional table saw, it should be noted that the slide may be adjusted longitudinally of the platform either before or after the inversion of the table by manipulation of the screw 47 and sliding of the slide back or forth within the frame. However, once the desired position is obtained, it is preferred to lock the slide in longitudinal position. Also, the device may be operated in tilted position when the apparatus is in the operation of Fig. 4 by tilting the whole frame around pivot bolt 23 as in Fig. 3, locking screw 25 to the desired position and then inverting the platform. It is the positioning of the whole frame and power assembly, etc., to one side of the platform, as may be seen in Fig. 3, that permits the inversion of the table with the blade in tilted position without interference with the platform supports. This enables the employment of the device as a conventional tilting arbor saw. Conventional rip or cutoff fences may be inserted in grooves 18 in the use of the device as a table saw. Arms 19 must be again swung under the platform, as in Fig. 7, to lock the platform in the desired position for use. Turnbuckle 53 may be adjusted vertically to increase or decrease the amount of saw blade extending above the table surface.

To return the saw to the position of Fig. 2, arms 19 are merely swung out and the table inverted. Freeing of the turnbuckle 53 will then permit this operation.

From the foregoing it will be seen that the invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all material hereinabove set forth or shown in the drawings is to be interpreted as illustrative and not in a limiting sense.

Having thus described my invention, I claim:

1. A combination table and drop saw comprising a frame having spaced, at least substantially parallel and substantially horizontal, top members positioned above the supporting surface for the frame, a platform pivotally mounted between said top members, said platform having a longitudinal blade receiving opening therein, mounting means fixed to one face of said platform, a blade mounting arm pivotally mounted adjacent one end thereof on said mounting means so its free end extends over said platform, a rotatable cutting blade rotatably mounted on said free end of said arm to at least partially enter said opening when said free end of the arm is positioned adjacent said platform face, means to fix the position of said arm relative the platform, drive means for the blade on said arm, the platform pivotable around its mounting between the top members at least 180° to alternately function as a table saw and a drop saw.

2. A combination saw as in claim 1 wherein the platform is pivoted centrally of its thickness and so mounted relative the top members that the top surface of the platform is always in line with the top surface of the top members when the top members and platform are aligned.

3. A combination saw as in claim 1 including grooves formed in the surface of the platform mounting the radial arm substantially parallel to the blade receiving opening to receive and position guide bar strips.

4. A combination saw as in claim 1 including grooves formed in the surface of the platform not mounting the radial arm to receive the guides for cut off and rip fences.

5. A combination saw as in claim 1 wherein the radial arm comprises a frame pivotally connected to the mounting means and a sliding arm adjustable lengthwise of the frame and the blade opening in the platform, the blade opening being elongate to permit longitudinal adjustment of the blade relative the opening in the platform.

6. A combination saw as in claim 1 including gripping means for the radial arm to permit convenient raising and lowering thereof.

7. A combination saw as in claim 1 wherein the radial arm is tiltably mounted on the mounting means and means for fixing the radial arm in any of the many tilt positions.

8. A combination saw as in claim 7 including a removable rim for the blade opening to enable widening of it for use in the various tilt positions.

9. A combination saw as in claim 1 including a power source for said blade mounted on the radial arm.

10. A combination saw as in claim 1 wherein the frame comprises two pairs of legs, each pair connected to themselves at the top by the top members and intermediate their length by secondary members, the end members of the pairs connected intermediate their length by cross members.

11. A combination saw as in claim 10 wherein the cross members are positioned substantially below the arc of the platform ends.

12. A combination saw as in claim 1 including means for fixing the platform relative the top members for operation in either of its alternate positions.

References Cited in the file of this patent

UNITED STATES PATENTS

| | | |
|---|---|---|
| 1,506,154 | Berthelsen et al. | Aug. 26, 1924 |
| 1,733,532 | Elliot | Oct. 29, 1929 |
| 1,787,191 | Fisk | Dec. 30, 1930 |
| 2,071,005 | Swickard | Feb. 16, 1937 |
| 2,171,024 | Coates | Aug. 29, 1939 |
| 2,319,025 | Wehringer | May 11, 1943 |
| 2,803,271 | Shaw | Aug. 20, 1957 |
| 2,804,890 | Fink | Sept. 3, 1957 |